2,910,354

PROCESS FOR SEPARATING COBALT AND NICKEL FROM AMMONIACAL SOLUTIONS

Ernst M. Goldstein, Elizabeth, N.J., assignor to the United States of America as represented by the Administrator, General Services Administration No Drawing. Application June 16, 1958
Serial No. 742,448

3 Claims. (Cl. 75—108)

This invention relates to the separation of nickel and cobalt from an ammoniacal solution in which they are dissolved and more particularly to a process in which the cobalt is selectively precipitated from the solution to provide eventually a nickel compound containing so little cobalt as to be commercially acceptable to a greater extent than heretofore.

A prior art process is known wherein nickel is extracted from nickeliferous ores containing some cobalt by reducing such ores in a furnace, next leaching the calcined ores in an ammoniacal solution to extract the nickel and the cobalt, and finally distilling the decanted product liquor to cause the nickel and cobalt to precipitate as nickel and cobalt compounds. In theory, such compounds will precipitate sequentially from the product liquor during distillation if most of the cobalt is in either the cobaltous or the cobaltic state and can be selectively filtered from the liquor. In actual practice, however, the two precipitates form practically simultaneously because of the presence in the product liquor of certain sulfur contaminants which tend so to affect the cobalt as to distribute it between the two states. It is therefore not commercially practical to separate the nickel and the cobalt by the known process so that after the intermixed nickel and cobalt compounds are calcined to form oxides of nickel and cobalt, the combined oxides, which are mainly nickel, are employed in industry wherever the amount of contained cobalt is not considered deleterious.

The foregoing inability to separate the cobalt from the nickel creates a number of disadvantages. Thus, if the amount of cobalt in the ore is so great that the finished oxides contain more than one part cobalt to one hundred parts nickel, the oxides have a considerably reduced market. To avoid this condition, it is customary to operate the process inefficiently in the leaching phase to limit the extraction of cobalt and thus produce a commercially acceptable product. However, this remedy has the effect of simultaneously lowering the amount of nickel eventually recovered leading to wastage of the nickel which ends up in the plant tailings heap.

The present invention contemplates the use of an additive to the ammonical product liquor which will definitely precipitate practically all of the cobalt from the liquor before the nickel whereby the latter is recoverable in the form of a relatively pure compound. An additive which successfully meets this objective and which permits selective precipitation of the cobalt from the product liquor with very little co-precipitation of nickel is benzimidazole, an organic precipitant for cobalt when the latter is in its cobaltous form. To insure that all of the cobalt is in its cobaltous form, the product liquor may be treated with a reducing agent which will convert any of the cobalt which is in its cobaltic form to the cobaltous form. Such reducing agents are the subject of other applications Serial No. 742,447, filed June 16, 1958, and Serial No. 742,449, filed June 16, 1958, now abandoned. The first of these applications discloses such reducing agents to comprise a mass of particles made of nickel, cobalt, iron, activated Raney nickel, iron ore, or reduced calcines of nickeliferous ores, the particles being in either powdered, granular or pelletized form. The second of these applications discloses that chemical reducing agents such as ammonium sulfamate, sodium thiosulfate, or sodium formaldehyde-sulfoxylate may be used. However, the preferred form of reducing agent for use with benzimidazole is sodium formaldehydesulfoxylate $$(CH_2OH-O-S-O-Na)$$

While it is preferred to treat the product liquor with the reducing agent before adding benzimidazole, the two may be used simultaneously or in any sequence without unduly affecting the results.

An object of the present invention is to provide a process whereby cobalt is precipitated selectively from an ammoniacal solution containing nickel and cobalt by treating such solution with an organic material before distillation thereof.

Another object of the invention is the provision of a process whereby cobalt is precipitated selectively from an ammoniacal solution containing nickel and cobalt by treating such solution with benzimidazole before distillation thereof.

A further object of the present invention is to provide a process whereby cobalt is precipitated selectively from an ammoniacal solution containing nickel and cobalt by treating such solution with a reducing agent and benzimidazole before distillation thereof.

Still another object is to provide a process whereby cobalt is precipitated selectively from an ammoniacal solution containing nickel and cobalt by treating such solution with sodium formaldehydesulfoxylate and benzimidazole before distillation thereof.

Other objects and many of the attendant advantages of this invention will be readily appreciated as the same becomes better understood by reference to the following detailed description.

The novel process disclosed herein is intended to be employed in conjunction with a well known process for recovering nickel from nickeliferous ore containing cobalt and iron such as is found in Cuba in considerable quantities. The ore is dried to reduce substantially the moisture content, is ground to produce a finely divided mass, and is fed into the top of a verticle multiple hearth reduction furnace through which it passes downwardly at at slow rate. Undiluted producer gas is introduced at a low point in the furnace and combustion gases may be introduced at various higher levels which cause the ore to be preheated to a temperature of about 600° C. and then to be slowly heated in a reducing atmosphere to a final temperature between 700° and 850° C.

The calcined ore is cooled after it leaves the furnace and is eventually treated with an ammoniacal solution to leach out the nickel and cobalt. The ammoniacal solution is allowed to settle for a sufficient time to permit decantation of a product liquor containing a large percentage of the nickel in the ore and much of the cobalt. The product liquor is passed through a bubble tower countercurrent to a flow of steam which distills the ammonia and other dissolved gases from the product liquor thereby causing the nickel and cobalt to precipitate generally in the form of carbonates. These carbonates may then be calcined to form oxides which are commercially useful. As previously pointed out, the nickel and cobalt co-precipitate and provide a final product which has more limited use than would a nickel product having a smaller cobalt content.

The present invention departs from the foregoing process by treating the product liquor after decantation and prior to distillation with an organic additive such as benzimidazole used alone or subsequently to treatment of the product liquor with a reducing agent such as sodium formaldehydesulfoxylate. When benzimidazole is used alone, it causes a large proportion of the cobalt to precipitate immediately from the product liquor and in advance of the nickel as cobalt compounds which can be separated from the product liquor as by filtration. Very little of the nickel compounds will precipitate at this time. Thereafter, the clarified liquor can be subjected to distillation to remove ammonia and carbon dioxide which results in precipitation of nickel basic carbonate, this precipitate being amenable to further treatment to produce a commercial nickel product relatively free of cobalt.

However, if the amount of cobalt in the product liquor is too high, it becomes desirable to selectively precipitate as much of the cobalt as is reasonably possible so as to make certain that the final nickel product is of commercial grade. The addition to the product liquor of sodium formaldehydesulfoxylate prior to the benzimidazole has the effect of reducing such cobalt as is in the cobaltic state to the cobaltous state in which form, as described hereinbefore, it is most amenable to precipitation by benzimidazole. Thereafter, the benzimidazole will cause precipitation selectively of so much of the cobalt as to insure a final nickel product with minimum cobalt content.

*Examples*

In order to test the efficacy of the organic additive and the reducing agent described above, several product liquors were analyzed to determine their nickel and cobalt contents. Varying amounts of the two compounds were then mixed with the samples of the product liquors to cause precipitation of the cobalt. The precipitate was then filtered and analyzed to determine the percentage of the original amount of cobalt in the product liquor which was precipitated and also the percentage of the nickel in the product liquor which was co-precipitated with the cobalt. The parts of cobalt to one hundred parts of nickel in both the original product liquor and the filtrate were also computed to form a basis of comparison of the profound results produced by the use of benzimidazole with or without sodium formaldehydesulfoxylate. These results are tabulated in the following table:

| G./100 ml. solution | | Pts. Co/100 pts. Ni | G. benzimidazole/ 100 ml. solution | G. sulfoxylate/ 100 ml. solution | Precipitate | | Filtrate, pts. Co/100 pts. Ni |
|---|---|---|---|---|---|---|---|
| Ni | Co | | | | Percent Ni | Percent Co | |
| 1.075 | 0.0262 | 2.4 | 0.4 | None | 2.6 | 16.4 | 2.20 |
| 1.064 | 0.036 | 3.1 | 0.1 | 0.1 | 0.3 | 2.6 | 2.33 |
| 1.064 | 0.0367 | 3.15 | 0.2 | 0.1 | 2.2 | 39.5 | 2.0 |
| 1.074 | 0.0264 | 2.46 | 0.2 | 0.05 | 2.8 | 40.2 | 1.37 |
| 1.074 | 0.0264 | 2.46 | 0.4 | 0.055 | 4.3 | 83.5 | 0.35 |
| 1.075 | 0.0262 | 2.4 | 0.4 | 0.055 | 3.8 | 75.0 | 0.64 |

A study of this table indicates that benzimidazole when used alone has the capacity of causing selective precipitation of cobalt from ammoniacal solutions containing nickel and cobalt, only very slight co-precipitation of nickel being produced. A comparison of column 3 of the table with column 8 shows, however, that when the cobalt in the solution is reduced to its cobaltous form by the addition of a small quantity of a reducing agent such as sodium formaldehydesulfoxylate, the effect of the benzimidazole in selectively precipitating the cobalt is quite dramatic and especially so when an adequate amount of benzimidazole is employed. Because most of the nickel remains in the solution and can be precipitated therefrom after clarification, a nickel product can be produced which is relatively free of cobalt and is therefore highly commercial.

It should be understood, of course, that the foregoing disclosure relates to only preferred embodiments of the invention and that numerous modifications and alterations may be made therein without departing from the spirit and scope of the invention as set forth in the appended claims.

What is claimed and desired to be protected by letters patent of the United States is:

1. In the recovery of nickel from an ammoniacal leach solution containing nickel, cobalt and the usual impurities, the process of obtaining the nickel content substantially free of cobalt which comprises mixing with the leach solution a quantity of benzimidazole effective to cause a substantial amount of the cobalt in the solution in cobaltous form to precipitate selectively, and separating the precipitate from the remaining solution.

2. In the recovery of nickel from an ammoniacal leach solution containing nickel, cobalt and the usual impurities, the process of obtaining the nickel content substantially free of cobalt which comprises mixing with the leach solution such quantities of a reducing agent and benzimidazole as are effective to cause a substantial amount of the cobalt in the solution in cobaltous form to precipitate selectively, and separating the precipitate from the remaining solution.

3. In the recovery of nickel from an ammoniacal leach solution containing nickel, cobalt and the usual impurities, the process of obtaining the nickel content substantially free of cobalt which comprises mixing with the leach solution such quantities of sodium formaldehydesulfoxylate and benzimidazole as are effective to cause a substantial amount of the cobalt in the solution in cobaltous form to precipitate selectively, and separating the precipitate from the remaining solution.

References Cited in the file of this patent
UNITED STATES PATENTS 2,177,412    Scott et al. _____ Oct. 24, 1939